United States Patent [19]

Yamazaki et al.

[11] Patent Number: 4,696,879

[45] Date of Patent: Sep. 29, 1987

[54] METHOD FOR EXPOSING A COLOR TRI-CATHODE RAY TUBE PANEL TO FORM THREE SEPARATE COLOR PHOSPHOR STRIPE PATTERNS BY EXPOSURE FROM THREE SEPARATE LIGHT SOURCE POSITIONS USING COMBINATION OF CORRECTIVE LENSES

[75] Inventors: Jun Yamazaki; Yukio Ito, both of Aichi, Japan

[73] Assignee: Sony Corporation, Tokyo, Japan

[21] Appl. No.: 659,421

[22] Filed: Oct. 10, 1984

[30] Foreign Application Priority Data

Oct. 14, 1983 [JP] Japan ................................ 58-192095

[51] Int. Cl.$^4$ ............................ G03C 5/00; B05D 5/06; G03B 41/00

[52] U.S. Cl. ........................................ 430/24; 430/23; 430/25; 430/26; 354/1

[58] Field of Search ........................ 430/23, 24, 25, 26; 354/1

[56] References Cited

U.S. PATENT DOCUMENTS

| | | | |
|---|---|---|---|
| 3,906,515 | 9/1975 | Hosokoshi et al. | 430/24 |
| 3,949,411 | 4/1976 | Yonai et al. | 354/1 |
| 4,001,018 | 1/1977 | Tsuneta et al. | 430/24 |
| 4,023,904 | 5/1977 | Sheets | 355/132 |
| 4,070,498 | 1/1978 | Nishizawa et al. | 430/26 |
| 4,078,239 | 3/1978 | Prazak et al. | 430/24 |
| 4,099,187 | 7/1978 | Masterton | 354/1 |
| 4,099,848 | 7/1978 | Osakabe | 354/1 |
| 4,183,637 | 1/1980 | Ueyama et al. | 354/1 |

*Primary Examiner*—Charles L. Bowers, Jr.
*Attorney, Agent, or Firm*—Hill, Van Santen, Steadman & Simpson

[57] ABSTRACT

A method for constructing a color cathode ray tube wherein a light source is placed at a number of positions and exposures are made and a film on the inside surface of the panel is exposed to form prescribed stripe width patterns using the transmission light intensity distribution which are superposed plural Fresnel diffraction waveforms and wherein correction lens system is selected which correspond to the exposure of various light source positions and have different values and the absolute value of the transmission light intensity distribution and the derivative $\partial I/\partial x$ of the transmission light intensity distribution at positions corresponding to the edge of the stripe width pattern are optimized throughout the inside surface of the panel.

2 Claims, 18 Drawing Figures

METHOD FOR EXPOSING A COLOR TRI-CATHODE RAY TUBE PANEL TO FORM THREE SEPARATE COLOR PHOSPHOR STRIPE PATTERNS BY EXPOSURE FROM THREE SEPARATE LIGHT SOURCE POSITIONS USING COMBINATION OF CORRECTIVE LENSES

BACKGROUND OF THE INVENTION

1. Field of the Invention

The present invention relates in general to methods and apparatus for exposing color cathode ray tubes to form a fluorescent surface.

2. Description of the Prior Art

In color cathode ray tubes it is conventional to provide a fluorescent surface such as a color fluorescent surface of stripe pattern wherein black stripes which comprise a light absorbing layer are formed between color fluorescent stripes of red, green and blue and can be made in a process such as described hereafter. In the prior art process, a photoresist film is first applied to an inside surface of a panel of a cathode ray tube and then dried and then an aperture grill which is a color selecting electrode with a number of beam transmission holes of slit shape which are ranged in the desired pitch is used as an optical mask and ultraviolet exposure is accomplished through the aperture grill. Then the exposed photoresist material is developed so as to form a number of resist layers of stripe shape in positions corresponding to the various colors. The ultraviolet exposure is accomplished three times, one each for the red, green and blue colors, by shifting the positions of the exposure light to the light source positions of the different colors.

Then, carbon slurry is applied to the whole surface of the tube including the resist layer and dried. Then the resist layer is lifted off together with a carbon layer above it so as to produce carbon stripes of the prescribed pattern, in other words, black stripes. A first fluorescent slurry of green color, for example, is applied thereto and exposed and then a development treatment is done so as to produce the green fluorescent stripe on the so-called blank photoresist stripe width between the prescribed carbon stripes. In similar processes, blue and red fluorescent stripes are formed in other photoresist stripes so that the intended color fluorescent surface is obtained.

In such prior art exposure methods, however, depending upon the optical dimension of the color cathode ray tube, the light intensity distribution transmitted through the slits of the aperture grill may be subject to Fresnel diffraction having a waveform distribution such as illustrated in FIG. 1A. When this occurs, so as to obtain the photoresist stripe required in the design of the cathode ray tube, in other words, with a width W of a blank photoresist stripe 3 between carbon stripes 2 as shown in FIG. 1B, the edge of the stripe of the photoresist stripe is produced at positions depending upon the derivative of $\partial I/\partial x$ of the transmission light intensity distribution I where I is the transmission light intensity and which is extremely small. The derivative of the photo crosslinking distribution of the photoresist film becomes small and thus the edge becomes uneven or rough which is significant as shown in FIG. 1B and unevenness of color will be produced macroscopically which will deteriorate the quality of the color cathode ray tube.

So as to eliminate these disadvantages in a conventional method illustrated in FIG. 2 the position of the exposure light source is moved from the reference position O for the green, blue or red color laterally to positions Q1 and Q2 which are laterally offset in opposite directions from the reference position O. Then ultraviolet rays 4 and 5 are irradiated from the positions Q1 and Q2, respectively. Such exposure method is referred to as the two point light source exposure method. In such method, the transmission light intensity distribution 8 comprises the superposition of two Fresnel diffraction waveforms 6 and 7 as illustrated in FIG. 3 and the intended photoresist stripe width W is obtained therefrom. In FIG. 2 a panel 9 with an inside surface coated by a photoresist film 10 is exposed with an aperture grill 11 and a correction lens 12 is mounted between the ultraviolet exposure source and the panel 9 as shown. The correction lens approximately provides that the light path will approximate the actual travelling path of the electron beam.

In the two point light source exposure method of the prior art, however, the superposed transmission light intensity distribution 8 illustrated in dashed line in FIG. 3 is not optimized throughout the inside surface of the panel as shown by the dip in the curve in FIG. 3 at the center and this method has the following disadvantages.

Depending upon the optical dimensions of the color cathode ray tube, there may be regions in the tube where it is impossible to properly manufacture the desired stripes. Since the derivative $\partial I/\partial x$ of the transmission light intensity distribution 8 becomes small in some regions of the panel inside surface, the derivative $\partial Q/\partial x$ of the photo crosslinking distribution of the photoresist film becomes small and thereby the variation of the photoresist stripe width becomes significant as illustrated in FIG. 1B and the quality of the tube deteriorates. Variations caused by the materials such as the slit width of the aperture grill or the distance between the aperture grill and the panel (Bar-Height) affects directly the generation of unevenness in color and the reproduction yield of tubes becomes lowered.

FIGS. 6A through 6F illustrate the transmission light intensity distribution in solid line and the derivative of the $\partial I/\partial x$ in broken line at arbitrary positions ($x_i$, $y_i$) on the inside of the panel surface obtained by the conventional two point light source exposure method. FIGS. 6A, 6B, 6C and 6D and 6E and 6F correspond to the center upper position ($x_i$, $y_i$=1, 180), the center ($x_i$, $y_i$=1, 1), the intermediate upper position ($x_i$, $y_i$=127, 180), the intermediate center position ($x_i$, $y_i$=127, 1), the peripheral upper position ($x_i$, $y_i$=255, 180) and the peripheral center position ($x_i$, $y_i$=155, 1) respectively. As clearly illustrated in FIGS. 6A through 6F the derivative $\partial I/\partial x$ of the transmission light intensity distribution at positions corresponding to the edge of the photoresist stripe width W becomes large in the center and at peripheral positions but the derivative $\partial I/\partial x$ becomes small in intermediate positions and, thus, the manufacturing becomes impossible or variations of the photoresist stripe width becomes significant at the intermediate positions.

SUMMARY OF THE INVENTION

In view of the above-mentioned disadvantages of the prior art, it is an object of the present invention to provide an exposure method and apparatus of a colored cathode ray tube wherein the derivative $\partial I/\partial x$ of the transmission light intensity distribution or exposure amount and the absolute value of the transmission light distribution I or the exposure amount are uniform throughout the inside surface of the panel and the derivative $\partial Q/\partial x$ of the photo crosslinking distribution of the photoresist film and the absolute value of the photo crosslinking distribution Q are completely optimized such that the fluorescent surface having a fine pitch can be exposed and obtained.

According to the invention, during the exposure of a cathode ray tube plural positions of the exposure light source are utilized and a film on the panel inside surface is exposed to prescribed stripe widths using the transmission light intensity distribution by superposing plural Fresnel diffraction waveforms using correction lens systems including correction lens and light intensity correction filters which are selected depending on the exposure at various light source positions. The absolute value of the transmission light intensity distribution or the exposure amount and the derivative $\partial I/\partial x$ of the transmission of the transmission light intensity distribution or exposure amount at positions corresponding to the edge of the stripe width are optimized throughout the inside surface of the panel.

In the exposure method of the invention the desired stripe width can be exposed throughout the inside surface of the panel. Consequently, for example, a fine pitch cathode ray tube having a fluorescent surface with fine pitch can be manufactured in mass production.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figures 1A, 1B:
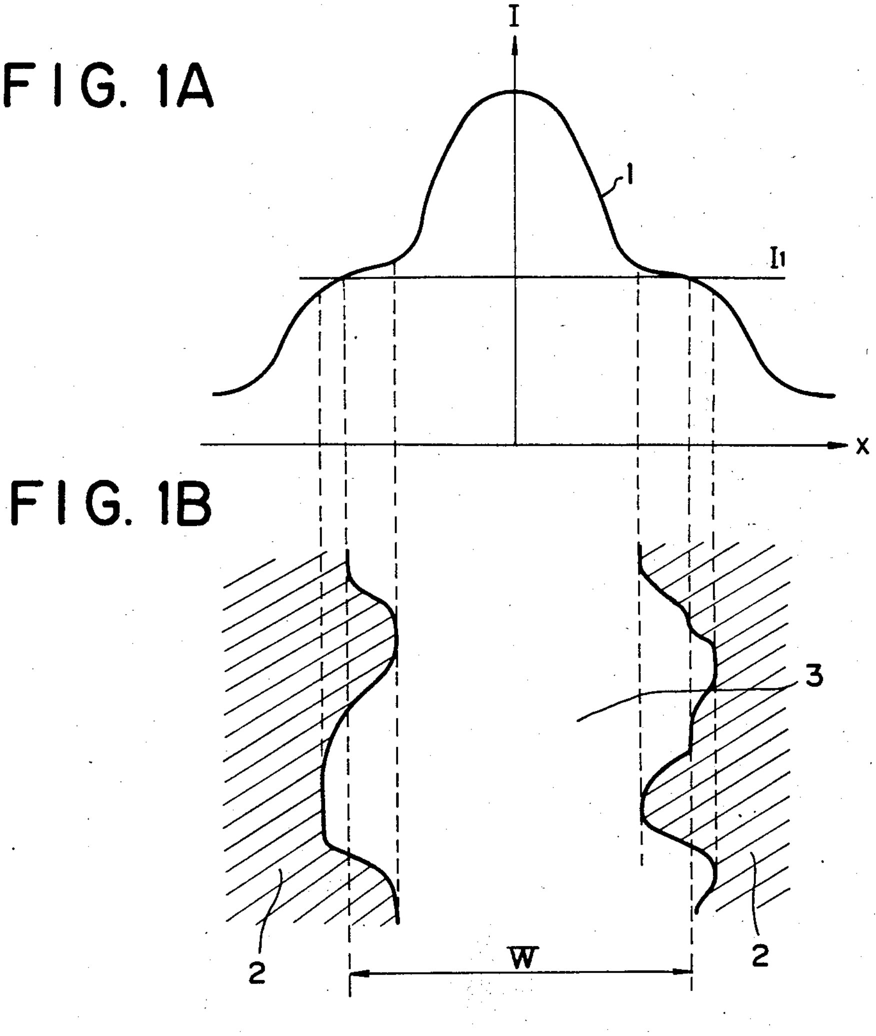
FIG. 1A is a graph of the transmission light intensity distribution.
FIG. 1B is a plan view of a stripe exposed by transmission light.
Figure 2:
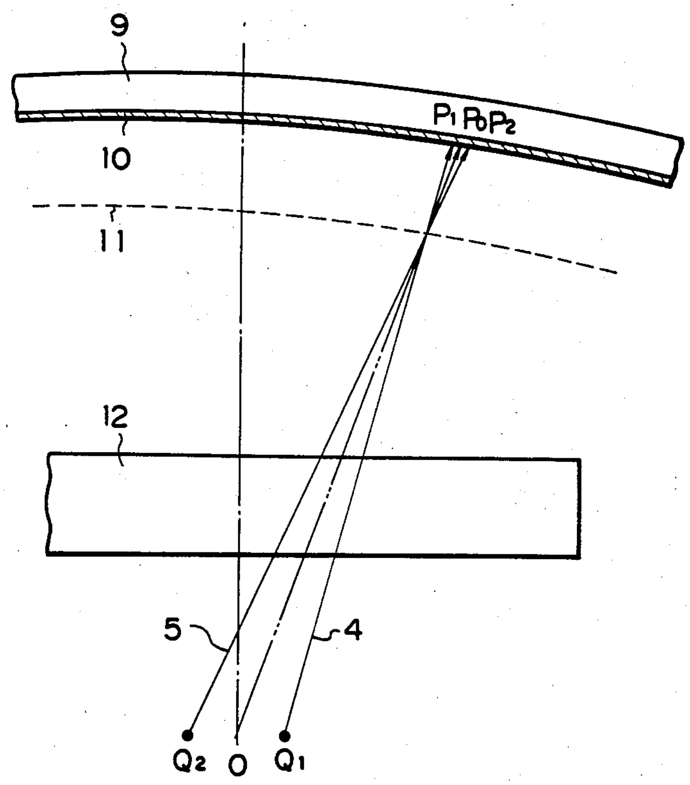
FIG. 2 is a diagrammatic view illustrating two point light exposure method of the prior art.
Figure 3:
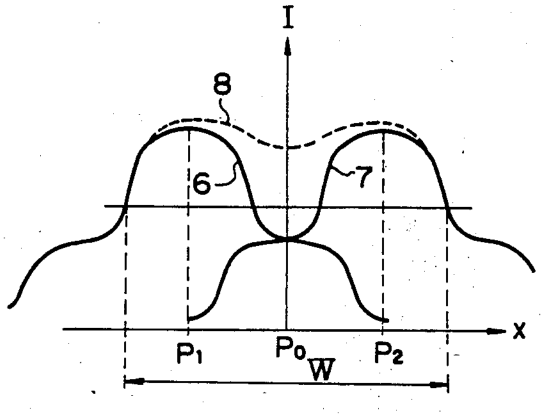
FIG. 3 is a graph illustrating the transmission light intensity distribution in superposition produced by the method of the prior art.
Figure 4:
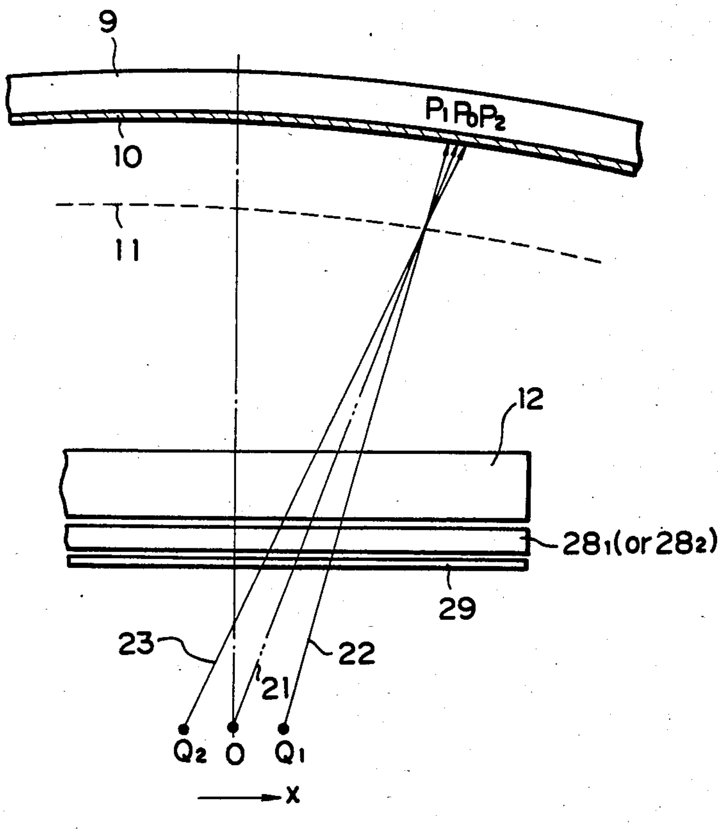
FIG. 4 is a diagram illustrating the exposure method of an embodiment of the invention.
Figure 5:
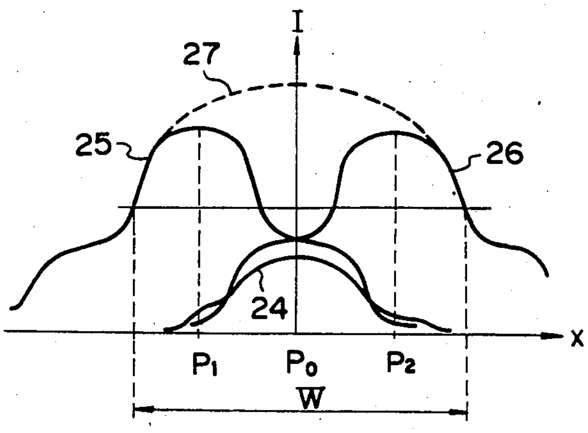
FIG. 5 is a graph of the transmission light intensity distribution which is superimposed produced by the method of the invention.
Figure 6A:
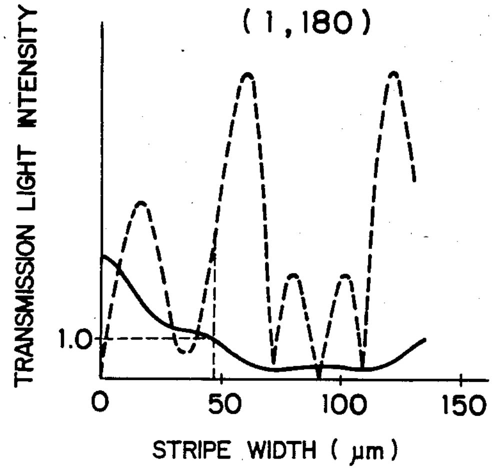
FIGS. 6A through 6F are graphs illustrating the transmission light intensity distribution and the derivative thereof at arbitrary positions on the panel inside surface produced by the prior art method.
Figure 6B:
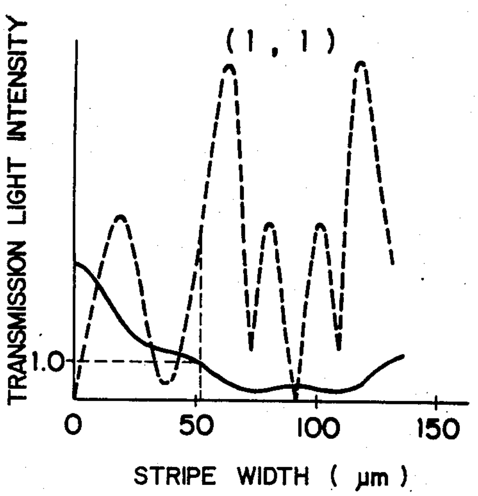
Figure 6C:
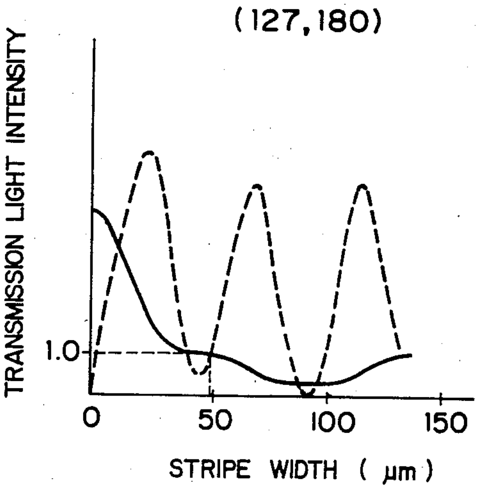
Figure 6D:
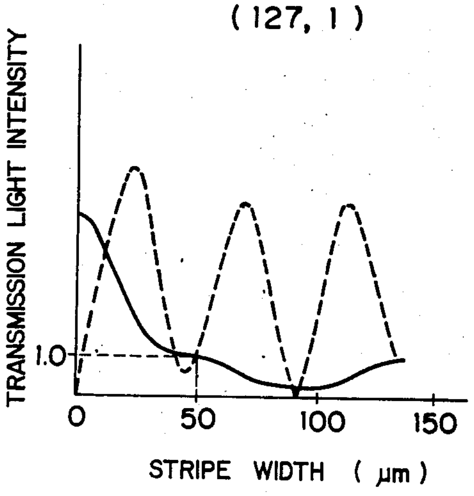
Figure 6E:
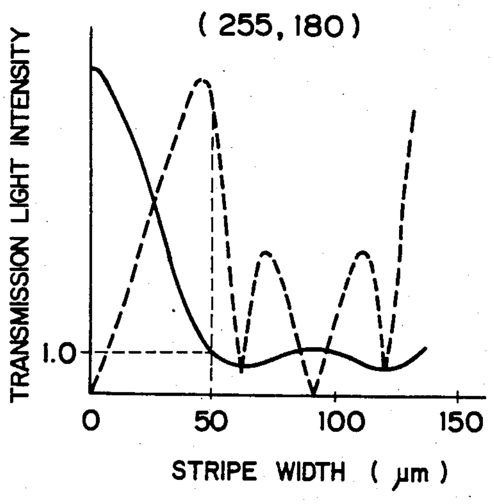
Figure 6F:
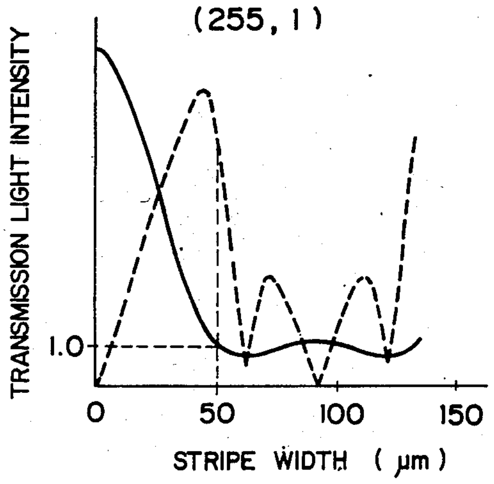

FIGS. 4 and 5 illustrate the present invention wherein the panel 9 has an inside surface which is to be coated by photoresist film 10 and an aperture grill 11 is mounted adjacent the panel 9 and a correction lens 12 is mounted for approximating the light path during exposure to the actual travelling path of the electron beam. The embodiment illustrates exposing a photoresist film 10 to form a black stripe and FIG. 4 illustrates the exposure of one stripe corresponding to the color green. In this embodiment, so as to expose one strip the exposure light source is moved to three different positions in the x direction in other words, to the reference position O and to offset lateral positions $Q_1$ and $Q_2$ and three different ultraviolet rays 21, 22 and 23 are irradiated from the positions O, $Q_1$ and $Q_2$ respectively. As illustrated in FIG. 5 the Fresnel diffraction waveforms 24, 25 and 26 produced by the ultraviolet rays 21, 22 and 23 are superimposed into transmission light intensity distribution 27 shown in dashed line and the exposure will be performed by the light intensity distribution 27. This method is referred to as the three point light source exposure method.

When the exposure is performed at the power source positions $Q_1$ and $Q_2$, in addition to the use of a correction lens 12 second correcting lenses $28_1$ or $28_2$ are selectively inserted so as to optimize the superposition of both of the Fresnel diffraction waveforms 25 and 26 throughout the inside surface of the panel. That is to enlarge the derivative $\partial I/\partial x$ of the superposed transmission light intensity distribution 27 at positions corresponding to the edges of the stripe width W throughout the inside surface of the panel. The correction lenses $28_1$ and $28_2$ are different from each other and have different lens characteristics and the correction lens $28_1$ and the correction lens 12 are combined and utilized when exposing from the light source position $Q_1$. On the other hand, the correction lens 12 and correction lens $28_2$ are combined when exposing from the light source position $Q_2$. When the exposure is performed from the light source position O the correction lens 12 and a light intensity correction filter 29 are used and the intensity distribution at the center pattern of the superposed transmission light intensity distribution 27 is controlled by the light intensity correction filter 29 so as to assure that the absolute value of the transmission light intensity distribution 27 will be made uniform throughout the inside surface of the panel.

In the exposure method of the invention, the correction lenses $28_1$ and $28_2$ are selected so that they correspond to the exposure of the light source positions $Q_1$ and $Q_2$ and thereby the waveform of the transmission light intensity diffraction waveforms 25 and 26 are optimized throughout the inside surface of the panel. Consequently, the derivative $\partial I/\partial x$ at positions corresponding to the edge of the stripe width to be exposed become large and the photoresist stripe width is obtained which has no unevenness throughout the inside surface of the panel. At the exposure from the light source position O, the absolute value of the transmission light intensity distribution 27 is made uniform throughout the inside surface of the panel by the light intensity correction filter 29 and over exposure may be prevented. As an example, for the photoresist film 10, PVP photosensitive agent composed of polyvinyl pyrrolidone (PVP) and 4, 4'-diazistilbene-2,2'-sodium diasulfonate (DAS) and having reciprocal law failure characteristics (decrease of photo crosslinking distribution in the region of low light intensity) have been recently announced. However, if the PVP photosensitive agent is overexposed, photo crosslinking points increase and cannot be completely removed during the lifting-off stage but remain partially in the photoresist stripe.

On the other hand, a PVA photosensitive agent composed of polyvinyl alcohol (PVA) and ammonium dichromate (ADC) is generally used. This agent may produce unevenness in the exposure pattern based on light diffraction by overexposure. However, since the overexposure is suppressed in the present invention, this problem is eliminated.

Figure 7A:
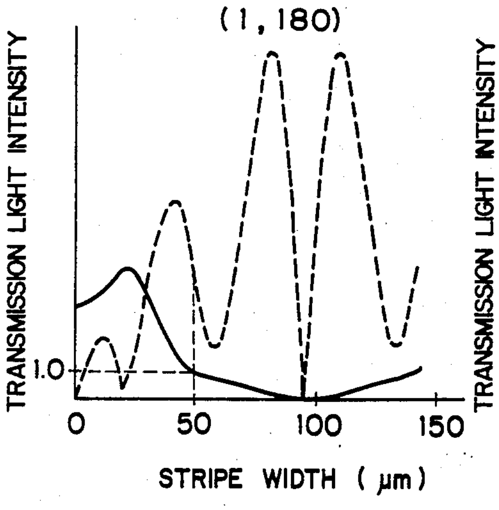
FIGS. 7A through 7F are graphs illustrating the transmission light intensity distribution and the derivative thereof at arbitrary positions on the panel inside surface which are produced by the present invention.
Figure 7B:
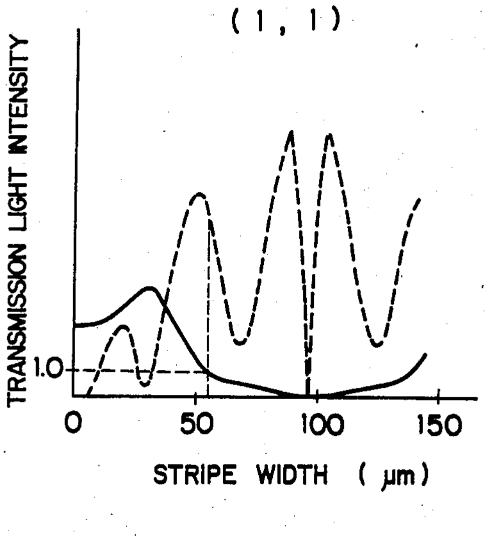
Figure 7C:
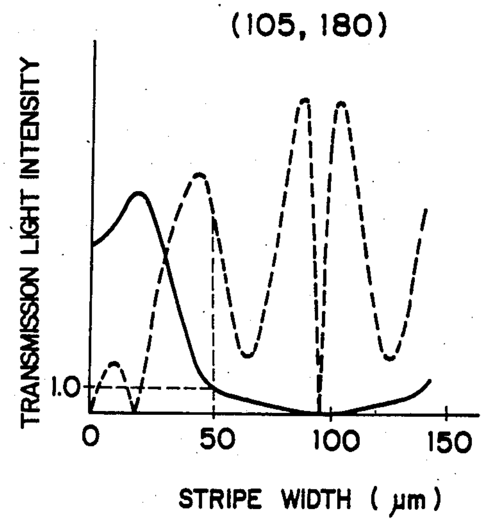
Figure 7D:
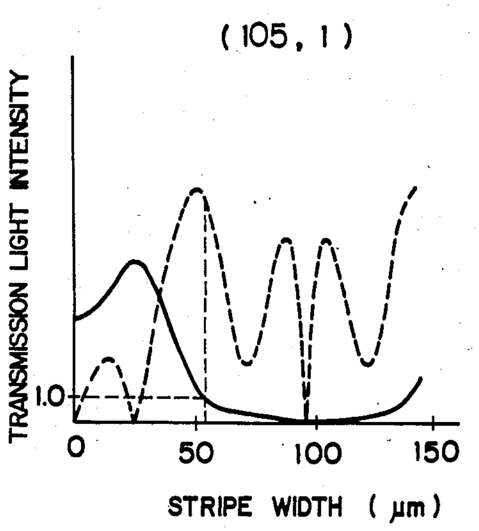
Figure 7E:
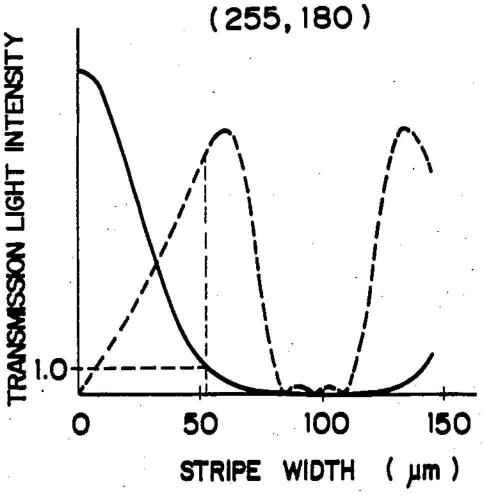
Figure 7F:
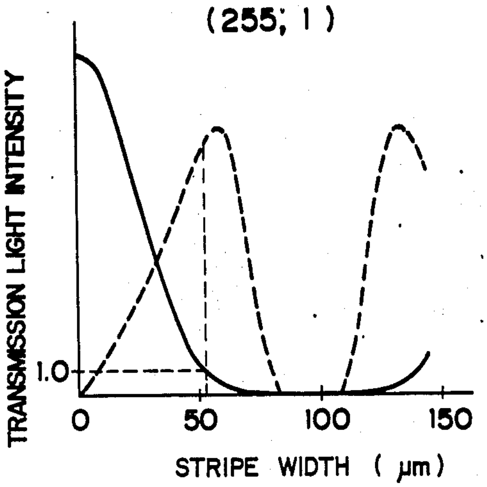

FIGS. 7A through 7F illustrate examples of the transmission light intensity distribution in solid line and the derivative $\partial I/\partial x$ in broken line at arbitrary positions ($x_i$, $y_i$) on the inside surface of the panel obtained by the exposure method of the invention. FIG. 7A gives the light intensity distribution and derivative $\partial I/\partial x$ at the center upper position where $x_i$ and $y_i$ equal 1, 180. FIG. 7B gives these values at the center position where $x_i$, $y_i$ equal 1, 1, FIG. 7C gives the intermediate upper position where $x_i$, $y_i$ equals 105, 180. FIG. 7D corresponds to the intermediate center position where $x_i$ and $y_i$ equal 105, 1. FIG. 7E illustrates the peripheral upper position where $x_i$ and $y_i$ equal 255, 180 and FIG. 7F illustrates the peripheral center position where $x_i$, $y_i$ equal 255, 1 respectively. It is seen from FIGS. 7A through 7F that the derivative $\partial I/\partial x$ at positions corresponding to the edge of the stripe width W becomes large throughout the center, intermediate and peripheral positions on the panel inside surface. Consequently, the difficulty and impossibility of manufacturing at the intermediate region due to unevenness of the photoresist stripe width is eliminated by the present invention.

Although the three point light source exposures are described in the above example, it is to be realized that the invention may also be applied to two point light source exposure and other multipoint light source exposure methods.

The light intensity correction filter is used to make the transmission light intensity throughout the inside surface of the panel as uniform as possible. Consequently, the filter may be selected to be suitable for exposure at the various light source positions.

According to the invention described above, a correction lens system is selected which corresponds to the exposure at various light source positions and the absolute values of the transmission light intensity distribution in superposition of plural Fresnel diffraction waveforms and the derivative as well as the absolute value and the derivative of the photo crosslinking distribution based on the transmission light intensity distribution are optimized throughout the inside surface of the panel. Thus, a fluorescent surface with a fine pitch pattern can be formed which is impossible in prior art methods. Since the variations of the photoresist stripes width are reduced, the quality of the cathode ray tube is increased. Variations based on materials are absorbed and unevenness of the exposed stripe edge is eliminated and thus the production yield is improved. Accordingly, the invention allows the exposure of a fine pitch color cathode ray tube having a color fluorescent surface of a fine pitch pattern.

Although the invention has been described with respect to preferred embodiments, it is not to be so limited as changes and modifications may be made therein which are within the full intended scope of the invention as defined by the appended claims.

We claim as our invention:

1. A method for exposing a tri-color cathode ray tube having a panel, wherein plural positions of each exposure light source are exposed to a prescribed stripe width using transmission light intensity distribution with superposition of plural Fresnel diffraction waveforms, comprising the steps of selecting a common correction lens and a first correction lens for an exposure at a first light source position, selecting the common correction lens and a second correction lens for an exposure from a second light source position and selecting the common correction lens and a light intensity correction filter for an exposure at a third light source position and said third light source position is centered between said first and second light source positions, and wherein the absolute value of the transmission light intensity distribution or amount of exposure and the derivative I/x of the transmission light intensity distribution or exposure amount at positions corresponding to edge of the strips width are optimized throughout the inside surface of the panel, exposing a first color stripe from said first light source position developing said first color stripe, exposing a second color stripe from said second light source position, developing said second color stripe, exposing a third color stripe from said third light source position and developing said third color stripe.

2. A method for exposing a tri-color cathode ray tube having an inside surface to form stripe patterns thereon comprising the steps of exposing through a first lens system comprising a common correction lens and a first correction lens a stripe through a shadow mask with a light source at a first position, exposing through a second lens system comprising a common correction lens and a second correction lens said stripe with a light source at a second position offset from said first position, and exposing through a third lens comprising the common correction lens and light correction filter system centered between said stripe with a light source at a third position which is from said first and second positions, so as to obtain a substantially uniform light intensity distribution and wherein the derivative I/x of the transmission light intensity or amount of exposure at the edge of the stripe is optimized over the entire inside surface of the tube, exposing a first color stripe from said first light source position, developing said first color stripe, exposing a second color stripe from said second light source position, developing said second color stripe, exposing a third color stripe from said third light source position and developing said third color stripe.

* * * * *